Figures 1, 2, 3:
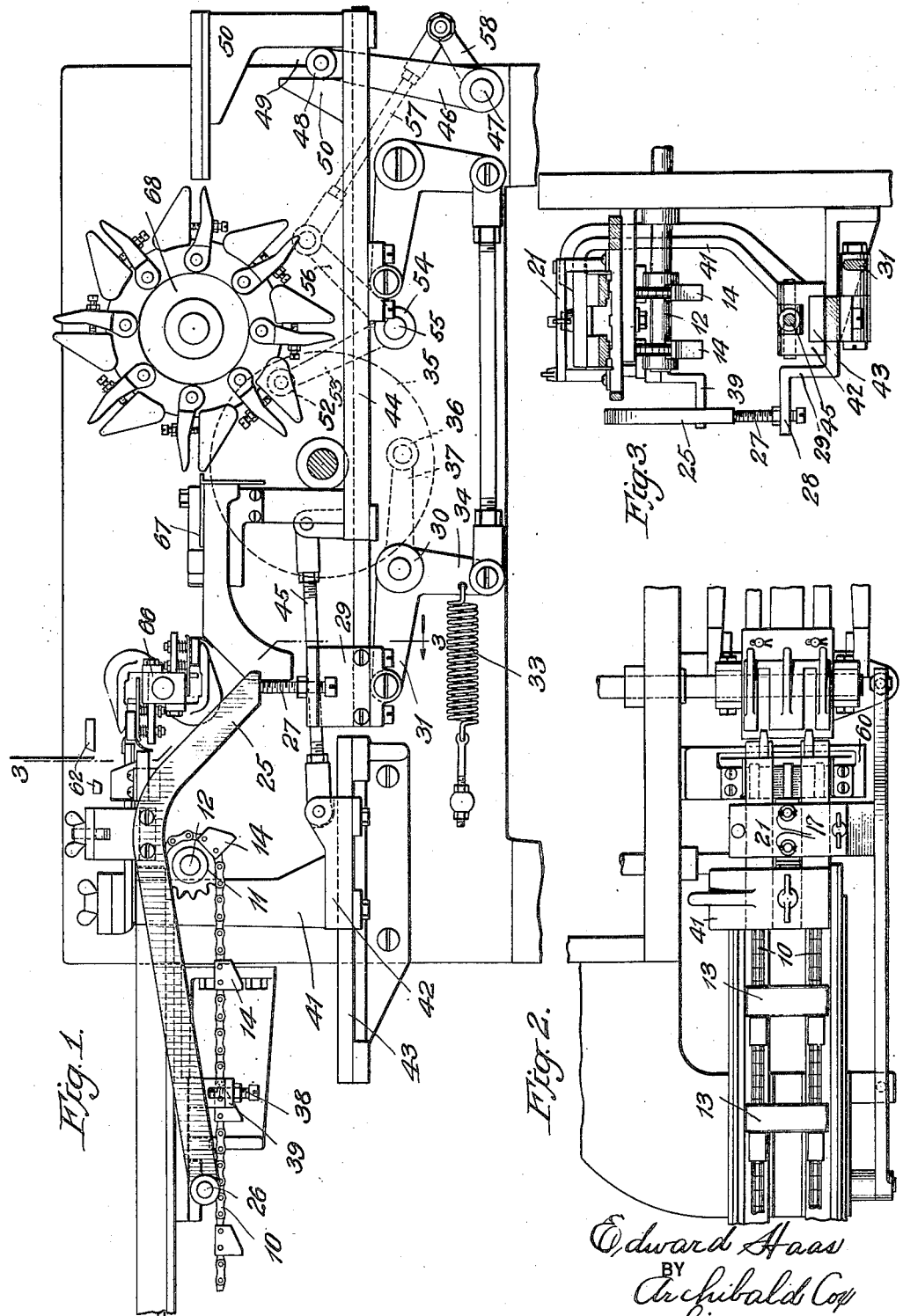

June 12, 1923.

E. HAAS

CONVEYER MECHANISM

Filed March 17, 1922    2 Sheets-Sheet 1

1,458,701

Edward Haas
BY Archibald Cox
his ATTORNEY

June 12, 1923.
E. HAAS
1,458,701
CONVEYER MECHANISM
Filed March 17, 1922    2 Sheets-Sheet 2
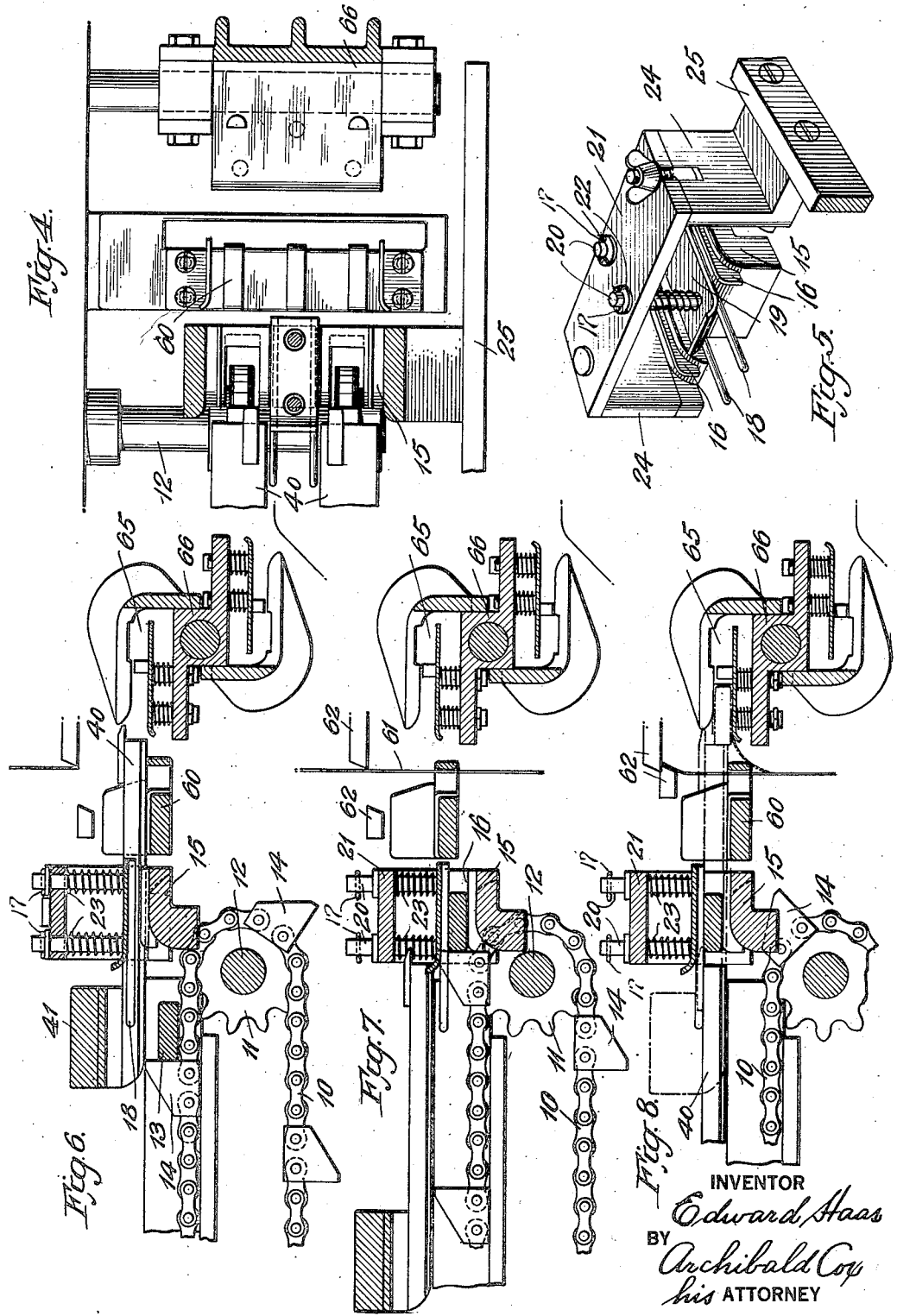
INVENTOR
Edward Haas
BY Archibald Cox
his ATTORNEY

Patented June 12, 1923.

1,458,701

UNITED STATES PATENT OFFICE.

EDWARD HAAS, OF BROOKLYN, NEW YORK, ASSIGNOR OF ONE-HALF TO MILFORD B. FERGUSON, OF BROOKLYN, NEW YORK.

CONVEYER MECHANISM.

Application filed March 17, 1922. Serial No. 544,466.

*To all whom it may concern:*

Be it known that I, EDWARD HAAS, a citizen of the United States, residing at Brooklyn, in the county of Kings, in the State of New York, have invented certain new and useful Improvements in Conveyer Mechanisms, of which the following is a specification.

The invention relates to an improvement in conveyer mechanisms for carrying forward a series of articles and delivering them one at a time to a machine or other mechanism in which one or more operations are performed upon the articles.

To illustrate the principle of the invention, the improved conveyer mechanism is described in the following specification as applied to a machine for automatically enclosing articles of various kinds in one or more wrappers. It will be understood, however, that the conveyer mechanism of the invention is not to be restricted to application to automatic wrapping machines, since it is equally adapted for application to and for use with various other kinds of machines. The improved conveyer mechanism is adapted for use in connection with any type of machine where the requirement is that a series of articles be carried forward and delivered one at a time to the machine.

The articles to be delivered to an automatic wrapping machine are usually stacked upon one another in a hopper or are carried to the machine on an endless belt or chain conveyer. Where the articles are of regular size and shape and where they have no tendency to stick together or adhere to the parts of the conveyer mechanism, no difficulty has been experienced in feeding articles to the wrapping machine. But where the articles are of irregular size and shape and where they have a tendency to stick together and to adhere to the conveyer, particularly in a moist and humid atmosphere, considerable difficulty has heretofore been experienced in feeding such articles to the wrapping machine. The object of the present invention is to produce an improved conveyer mechanism having provision whereby articles of irregular size and shape and whereby articles which have a tendency to stick together and to adhere to the conveyer mechanism may be delivered in an efficient manner to the wrapping machine or other mechanism adapted to operate upon the articles. To the accomplishment of this object the invention consists in the improved conveyer mechanism hereinafter described and particularly pointed out in the appended claims.

The preferred form of the invention is illustrated in the accompanying drawings, in which Fig. 1 is a side elevation of the improved conveyer mechanism showing its application to an automatic wrapping machine; Fig. 2 is a top plan of the conveyer mechanism, together with a part of the wrapping machine; Fig. 3 is a vertical elevation taken along the line 3—3 of Fig. 1, looking in the direction of the arrow; Fig. 4 is a plan, partly in section, on an enlarged scale, at the point where the conveyer mechanism is connected with the wrapping machine; Fig. 5 is a perspective view of the elevator; and Figs. 6, 7 and 8 are sectional views of the conveyer mechanism and the adjacent parts of the wrapping machine to illustrate various stages in the operation of delivering an article from the conveyer to the wrapping machine.

The improved conveyer mechanism as illustrated in the drawings comprises means for carrying the articles forward and delivering them one at a time to a receiving means by which they are positively engaged and removed from the path of travel of the conveying means and carried to another point where they are ejected from the receiving means and delivered to the machine or other mechanism adapted to operate upon them. The means for carrying the articles forward and delivering them one at a time at the receiving station comprises an endless conveyer 10 shown in the drawings as two chains, the forward ends of which are engaged by sprocket wheels 11 mounted on a shaft 12. The conveyer chain may be of any length sufficient to afford the operator opportunity to place the articles thereon. The conveyer may be run continuously or intermittently. The mechanism of the invention adapts itself equally well to a constantly or intermittently operating conveyer. For the most efficient results, it is usually desirable that the conveyer travel continuously. The shaft 12 then will be a constantly rotating shaft. In order that the articles 13 may be properly spaced on the conveyer, a series of equally spaced lugs 14 are inserted in the conveyer chains. The lugs 14 also serve to positively deliver the articles to the receiving mechanism.

As the articles are carried forward toward the wrapping machine and delivered one at a time, they are received in a receiving mechanism or elevator, shown in perspective in Fig. 5. The elevator comprises a horizontally-disposed platform 15 provided with the raised longitudinally disposed knife-edges 16 upon which the articles are adapted to rest. When the elevator is in position to receive an article from the conveyer, as shown in Fig. 7, the top surfaces of the knife-edges are on a line with the top surface of the conveyer so that the elevator receives the articles from the conveyer on the same plane on which they are carried by the conveyer. It will be observed, by reference to Fig. 7, that the articles are positively carried into the receiving mechanism or elevator by the lugs on the conveyer. In order that the article may be properly delivered to the elevator, means are provided for yieldingly engaging the top surface of the article before it is pushed into the elevator. This mode of operation serves to straighten the articles on the conveyer and to prevent them from jumping at the point of discharge. The means for yieldingly engaging and holding the articles as they are discharged from the conveyer comprises a pair of longitudinally extending fingers 18 secured to the under surface of the upper or yielding plate 19 of the elevator. The plate 19 is provided with two upwardly extending posts 20 which loosely pass through the plate 21 and are held in place by washers 22 and cotter pins 17. The plate 21 is removably secured to the side pieces 24 of the elevator so as to provide ready access to the point where the articles are discharged from the conveyer and received by the elevator. The plate 19 is yieldingly pressed downward by springs 23 surrounding the posts 20. The platform 15 with its knife edges 16 and the plate 19 with its fingers 18 constitute a pair of horizontally-disposed jaws for yieldingly and positively grasping and holding the articles after they have been received from the conveyer and until they are delivered to the wrapping machine. Thus provision is made for presenting the articles in a proper manner to the wrapping machine.

The receiving mechanism or elevator is lowered into position to receive the articles from the conveyer, as shown in Fig. 7, and is raised to remove the articles from the path of travel of the lugs 14. For this purpose, the elevator is secured to an arm 25 pivotally mounted at 26 on the frame of the machine. The free forward end of the arm 25 is down-turned, as shown in Fig. 1, and rests on the upper end of a screw 27 threaded in the top flange 28 of a bracket 29 supported by a lever 30 forming part of a transport system of the wrapping machine. The bracket 29 is pivotally connected with an arm 31 of the three-armed bell crank 30. The elevator is raised by the action of a spring 33, one end of which is adjustably secured to the frame of the machine and the other end of which is secured to the arm 34 of the bell crank. The elevator descends by gravity into receiving position when the bracket 29 is lowered by the cam indicated in dotted lines at 35, which is provided with the cam groove (not shown) engaging the roll 36 on the end of the arm 37 of the bell crank 30. The receiving position of the elevator is determined by a screw 38 adjustably received in a bracket 39 secured to the machine frame.

When the elevator has received the article from the conveyer and has been actuated to move the article out of the path of travel of the lugs 14, the article is raised to the point at which it is discharged from the elevator. This point is on a plane with a pair of plunger arms 40 forming part of the wrapping machine. The plunger arms 40 are secured at their rear ends to a bracket 41 rising from a slide 42 adapted to reciprocate on a guide 43 secured to the machine frame. Reciprocating movements are imparted to the slide 42 from the slide 44 of the transport system and with which the slide 42 is connected by means of a link 45. The slide 44 of the transport system is reciprocated by a lever 46 pivoted at 47 and provided at its upper end with a roll 48 which is loosely received in a slot 49 formed between the brackets 50 rising from the rear end of the slide 44. Oscillating movements are imparted to the lever 46 from a groove (not shown) in the cam 35, in which is received a roll 52 carried by the free end of an arm 53 of a bell crank 54 pivoted at 55. The other arm 56 of the bell crank 54 is connected by a link 57 with the arm 58 of the lever 46.

The mode of operation of the improved conveyer mechanism in delivering an article to the wrapping machine is as follows: It is assumed that the conveyer chain moves forward continuously and uninterruptedly. The articles are placed on the conveyer by the operator, so that there is one article between each pair of lugs. The upper section of the conveyer chain carries the articles toward the wrapping machine. As the articles approach the point of discharge, the elevator is in its raised position as shown in Fig. 6, with the fingers 18 above the article. Before the article reaches the point of discharge, the elevator 15 has descended into receiving position, thereby causing the fingers 18 to yieldingly engage the article 13 on the conveyer. The articles are sometimes brought to this point simply by reason of their frictional engagement with the upper surface of the traveling conveyer. Sometimes one end of an article is considerably in advance of the other end. Whatever the position of the article on the conveyer, the yielding engagement of the fingers 18 holds the article in such position that the lugs 14 can properly insert it between the jaws of the elevator, that is, with its longitudinal axis in line with the longitudinal axis of the elevator. Substantially simultaneously with the completion of the insertion of an article between the yielding jaws of the elevator by the conveyer, the elevator begins to rise, so that as the lugs continue their travel the article is removed out of their path. The article is then raised to the position shown in Fig. 8. Thereupon the plungers 40 move forward and push it through the section 60 and against the wrapper 61, which has just been severed by the cutting blades 62. In the continued forward movement of the plunger, the article and wrapper are pushed into the upper jaw 65 of the tumble box 66, as indicated in dash and dot lines in Fig. 8.

It is unnecessary to follow in detail the steps of the wrapping operation. When the plungers 40 have forced the article and wrapper into the uppermost pocket of the tumble box, they are retracted to permit the elevator to descend into receiving position. During these movements, the tumble box rotates in an anti-clockwise direction to bring the now empty lowermost pocket to the uppermost position ready to receive the next article and wrapper. The partially wrapped articles are pushed from the lowermost pocket of the tumble box through the section 67 and into one of the pockets carried by the wheel 68.

It will be recognized from the foregoing description taken in connection with the drawings that the improved conveyer mechanism of the present invention is particularly adapted for feeding articles of irregular shape and size and articles having a tendency to stick together and to adhere to the parts of the apparatus with which they come in contact. The yielding engagement of the articles by the spring-pressed fingers 18, before they are received in the jaws of the elevator, prevents the articles from fortuitous ejection from the conveyer as the latter passes around the sprocket wheels. The yielding and positive engagement of the article in the jaws of the elevator and its presentation to the wrapping machine plungers in the relative position in which it has been received from the conveyer assures that it will be delivered in a proper manner to the wrapping machine.

Having thus described the invention what I claim as new is:—

1. A conveyer mechanism for conveying a series of articles to a machine provided with a plunger for introducing the articles one at a time into the machine, comprising a conveyer provided with a series of lugs for carrying forward the series of articles, a pair of horizontally-disposed jaws for receiving the articles one at a time from the conveyer, means on which the lower jaw is fixedly mounted and on which the upper jaw is yieldingly mounted, and means for moving the jaws from the point of receiving the articles to the point where they are introduced into the machine.

2. A conveyer mechanism having in combination a conveyer for carrying forward a series of articles, a pivoted arm, means for raising and lowering the free end of the arm, a pair of horizontally-disposed jaws carried by said arm to receive the articles one at a time from the conveyer while the arm is in lowered position, and means for ejecting the article carried by the jaws while the arm is in raised position.

3. A conveyer mechanism having in combination a conveyer for carrying forward a series of articles, a pair of jaws for receiving the articles one at a time from the conveyer while the jaws are in lowered position, means for supporting the jaws so that they will be substantially horizontally-disposed in raised and in lowered position, means for raising and lowering the jaws, and means for ejecting the article carried by the jaws while they are in raised position.

4. A conveyer mechanism having in combination, a constantly traveling conveyer for carrying forward a series of articles, means for engaging an article and yieldingly holding it against the conveyer as the conveyer is discharging it therefrom, and means for receiving the article and removing it from the path of travel of the conveyer.

5. A conveyer mechanism having in combination, a constantly traveling conveyer provided with a series of lugs for carrying forward a series of articles, an elevator provided with a pair of jaws for receiving the articles one at a time from the conveyer, one of said jaws being yieldingly mounted and having provision for engaging the article before it is pushed from the conveyer into the jaws, and means for raising the elevator out of the path of travel of the lugs.

6. A conveyer mechanism having in combination, a conveyer for carrying forward a series of articles, means for receiving the articles one at a time from the conveyer, said means having a finger for yieldingly pressing the article against the conveyer as it is being discharged therefrom, and means for removing the discharged article out of the path of travel of the conveyer.

7. A conveyer mechanism having in combination, a constantly traveling conveyer provided with a series of lugs for carrying forward a series of articles, an elevator for receiving the articles one at a time from the conveyer, said conveyer comprising a pair of parallel horizontally arranged jaws adapted to receive the article on the plane on which it is carried by the conveyer, and means for actuating the conveyer to move the article out of the path of travel of the conveyer.

8. A conveyer mechanism having in combination a conveyer provided with a series of lugs for carrying forward a series of articles, a vertically reciprocating elevator for receiving the articles one at a time from the conveyer, said elevator comprising a horizontally-disposed platform adapted to be lowered to the plane on which the articles are carried by the conveyer, a yielding plate for cooperating with the platform to receive the articles and provided with a finger to engage the article before it is received in the elevator, and means for raising and lowering the elevator.

9. A conveyer mechanism having in combination a conveyer provided with a series of lugs for carrying forward a series of articles, a pair of horizontally-disposed relatively yielding jaws between which the lugs are adapted to push the articles one at a time, means for removing the jaws out of the path of travel of the lugs and for holding the jaws on a plane substantially parallel with the plane on which the jaws receive the article from the conveyer, and means for ejecting the article from the jaws.

10. A conveyer mechanism having in combination a conveyer provided with a series of lugs for carrying forward a series of articles, a pivoted arm, means for raising and lowering the free end of the arm, a platform secured to the arm adapted to be on substantially the plane of the conveyer when the arm is in lowered position, a yieldingly mounted plate carried by the arm for cooperating with the platform to receive an article from the conveyer, said plate being provided with a finger for engaging the article while it is still on the conveyer, and means for ejecting the article from between the plate and platform.

11. A conveyer mechanism having in combination a conveyer for carrying forward a series of articles, a pair of horizontally-disposed jaws for receiving the articles one at a time from the conveyer, one of said jaws being yieldingly mounted and provided with means adapted to come into engagement with the article while it is on the conveyer and before it has been inserted between the jaws, means for moving the jaws out of the path of travel of the conveyer, and means for ejecting the article from the jaws.

12. A conveyer mechanism having in combination a conveyer for carrying forward a series of articles, a horizontally-disposed platform, means for lowering the platform to the plane of the conveyer, and for raising the platform out of the path of travel of the conveyer, a yieldingly mounted plate for cooperating with the platform, said plate being provided with a finger which is adapted to come into contact with the article while the platform is being lowered to the plane of the conveyer, and means for ejecting the article from between the plate and platform when the platform has been raised.

EDWARD HAAS.